Sept. 11, 1928.
J. LAWSON
1,684,101
INDICATING MECHANISM
Filed Jan. 3, 1928 2 Sheets-Sheet 1
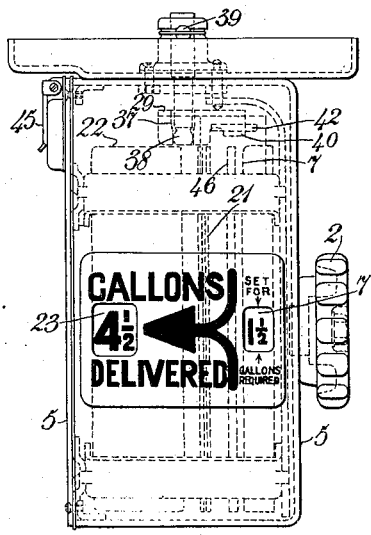
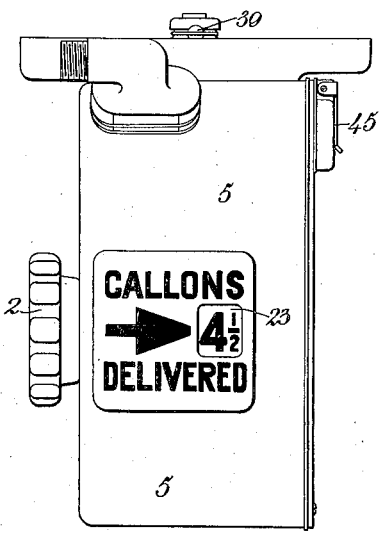
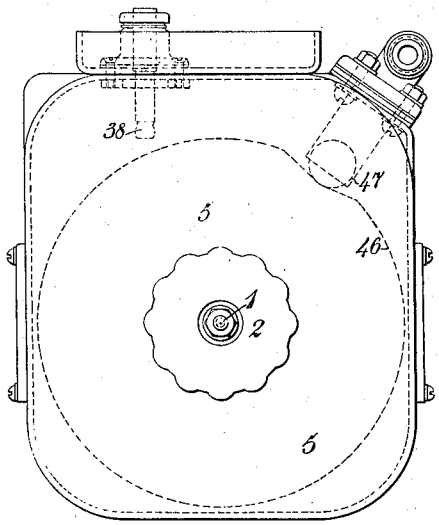
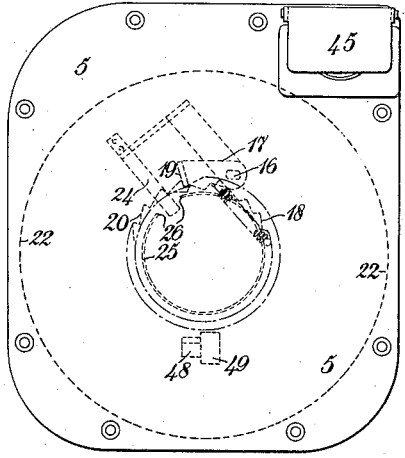
INVENTOR:
JOSEPH LAWSON,
By his Attorneys,

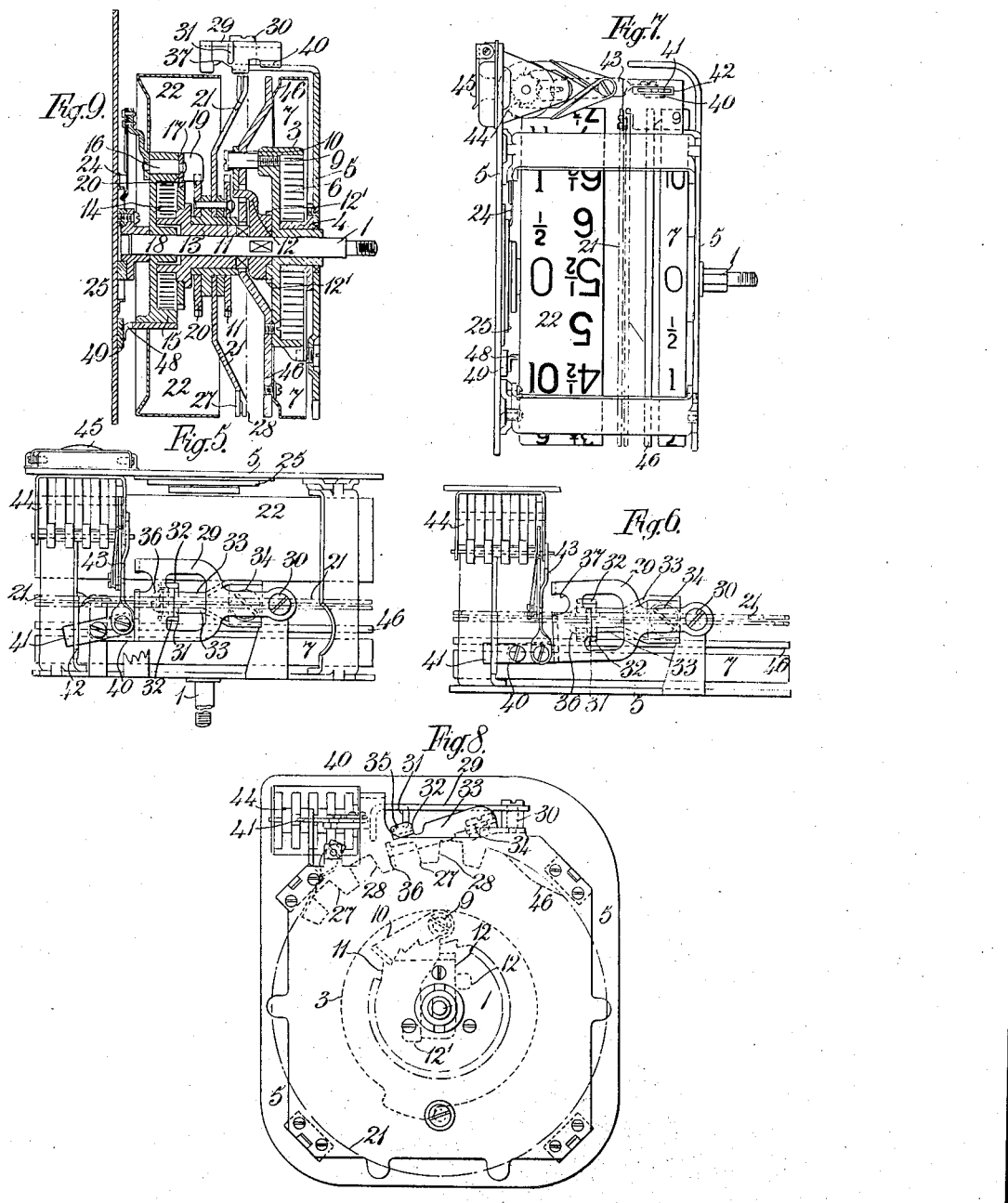

Patented Sept. 11, 1928.

1,684,101

UNITED STATES PATENT OFFICE.

JOSEPH LAWSON, OF GREAT ST. HELENS, LONDON, ENGLAND, ASSIGNOR TO ASIATIC PETROLEUM COMPANY, LIMITED, OF ST. HELENS COURT, LONDON, ENGLAND.

INDICATING MECHANISM.

Application filed January 3, 1928, Serial No. 244,340, and in Great Britain September 24, 1926.

This invention relates to indicating mechanism, applicable for use with apparatus for delivering measured quantities of liquid, and is particularly suitable for curb-side pumps or the like, comprising a pair of containers into which liquid is alternately and automatically (by means of a change-over valve or the like) supplied and delivered, liquid being delivered from one container while liquid is being supplied to the other container.

The main object of the present invention is to provide improved mechanism for indicating the quantity of liquid it is desired to deliver and/or the quantity of liquid which has been delivered.

According to the present invention, indicating mechanism comprises a setting indicator, adapted to indicate the quantity of a fluid to be delivered, means such as a spring adapted to be wound up on actuation of the setting indicator, escapement or like mechanism adapted to be actuated on or during delivery of the fluid, and mechanism which is adapted to indicate the quantity of the fluid which has been delivered and which, on operation of the escapement or like mechanism, is actuated by the said spring means.

In one way of carrying out the invention, when the indicating mechanism is set by the operator to indicate either the quantity of liquid which it is required to be delivered and/or the quantity of liquid which has been delivered, a spring is placed under tension by the manual operation of actuating the setting handle, the said spring being employed to drive the indicating mechanism.

If the apparatus be applied to a curb-side pump of the kind previously referred to, in which a change-over valve or the like is employed automatically to direct the inflow and outflow to and from a pair of containers, the said change-over valve is employed to control an escape mechanism carried by the setting mechanism.

With such a construction it will be seen that the work required to be done by the change-over valve is very small, and offers practically no resistance to its operation.

Preferably means are provided whereby, as soon as the quantity of liquid required has been delivered and the setting mechanism returns to zero, air is admitted to the pump by means of which the container is filled so that liquid ceases to be delivered by the pump.

Preferably also the setting handle is so arranged that if it be required to deliver a lesser quantity of liquid than had been ordered, the said handle can be returned to zero, whereby air is, in the manner referred to above, admitted to the pump.

Preferably the indicating mechanism is arranged as an independent unit and so constructed that it can be removed in case of failure without affecting the operation of the delivering apparatus and subsequently replaced by another indicating unit.

In order to effect this the over-centre spring for the change-over valve is enclosed in the body of the valve mechanism and is not connected in any way to the indicating mechanism, and the said valve actuates the escape mechanism through a glandless transmitting device which may comprise a rocking lever the end or ends of which detachably engage the valve and/or the escape mechanism.

According to a further feature of the invention the escape mechanism is connected to counting mechanism through a "lost motion" device so arranged that the said mechanism is not actuated until after the change-over valve has nearly completed its movement and is under the influence of the over-centre spring which completes its movement.

This device may conveniently comprise a lost motion lever which is pivoted to the escapement lever of the escape mechanism and one end of which passes through a slot formed in a fixed plate, while the other end is pivotally connected to a lever adapted to actuate the counting mechanism, the arrangement being such that when the escapement lever is first moved, the lost motion lever travels along the length of the slot, and when the escapement lever is near the end of its travel (i. e. when the lever is in such a position that the spring, previously wound up by the setting handle, is allowed to rotate the said indicators), the said lost motion lever engages one or other of the end walls of the slot, and continued movement of the escapement lever causes the lost motion lever to rock about its pivot on the escapement lever and thereby actuate the counting mechanism.

After the required quantity of liquid has been delivered, the indicator for indicating the quantity of liquid which has been delivered is returned to zero by a return spring when the setting handle is again actuated.

In the accompanying drawings which illustrate the invention, Figure 1 is a front elevation, Figure 2 a rear elevation, Figure 3 a right hand side elevation Figure 4 a left hand side elevation, Figure 5 a plan, Figure 6 a part plan with the mechanism in an alternative position, Figure 7 a front elevation with the casing removed, Figure 8 a right hand side elevation with the casing removed, and Figure 9 is a longitudinal section.

1 is a spindle to which is secured a setting knob 2, and 3 is a barrel loosely mounted on the spinudle 1 and rotatably mounted in a bearing 4 formed on a casing 5. 6 is a spring one end of which is anchored to the barrel 3 and the other end to the exterior of the bearing 4, and 7 is a drum which is carried by the barrel 3 and has on its periphery numerals for indicating the quantity of liquid which is to be delivered, the numerals being visible through a window 7ª formed in the casing 5. 9 is a pin secured to the barrel 3, and 10 is a pawl which normally is in engagement with a ratchet wheel 11, but which may be lifted out of engagement therewith by a crank member 12 secured to the spindle 1, and adapted, when moved in a clockwise direction to engage driving abutments 12' formed on the barrel 3. 13 is a sleeve which is rotatable with the spindle 1, and 14 is a second spring, one end of which is anchored to the said sleeve and the other end to a barrel 15 provided with a pin 16 to which is secured a spring-urged pawl 17, normally in engagement with a cam wheel 18 fast with the sleeve 13. The pawl 17 is also provided with a projection 19 normally in engagement with a ratchet wheel 20 which, together with the ratchet wheel 11, is secured to an escapement wheel 21 rotatably mounted on the sleeve 13.

22 is a drum having numerals for indicating the quantity of liquid which has been delivered, the numerals being visible through windows 23 formed in the casing 5.

The pin 16 is also fast with an arm 24 of springy material which normally lies within a stationary bearing ring 25 which is cut away at 26.

The escapement wheel 21 is formed of two toothed portions 27, 28 the teeth 27 being staggered relatively to the teeth 28. 29 is a lever pivoted at 30 and provided with a turned down portion 31 adapted to engage upstanding cheeks 32 integral with escape levers 33 pivoted at 34 and held together by a spring 35, and 36 are right angle projections formed on the levers 33 and adapted respectively to engage the teeth 27, 28. The lever 29 is cut away at 37 to accommodate a ball headed lever 38 pivoted at 39 and adapted to be actuated by a fluid tight motion transmitting member which is actuated by a change-over mechanism such as described in my pending application No. 244,342, filed January 3, 1928 for means for filling two containers alternately, and which comprises a flexible tube secured at one end to the casing of the change-over mechanism and a rod adapted at one end to extend within a socket formed in the upper end of a lever 38, and at the other end secured to the other end of the flexible tube, a cap on which is adapted to be engaged by projections on the change-over mechanism or which receives an eccentric sheath in engagement with an eccentric carried or actuated by the change-over mechanism.

It will be apparent from the preceding paragraph that when the lever 38 (Fig. 1) is rocked about its pivot at 39, it will oscillate the lever 29 about its pivot 30. The movement of lever 30 will, through the down turned portion 31 and the cheeks 32, which are integral with the spring pressed escapement levers 33, alternately release the escapement teeth 27, 28. The lever 38 is rocked from one position to the other once for each unit of liquid delivered. It will be seen therefore that the release of each tooth 27, 28 will permit the delivery indicator drum to move one step and so indicate the number of units of liquid delivered.

The lever 29 is provided with an extension 40 on which is pivoted a lever 41 one end of which moves in a slot 42 formed in a fixed bracket, and the other end of which is pivotally connected to a link 43 adapted to actuate a counting mechanism 44 which is visible through a window 45 formed in the casing 5.

46 is a cam disk fast with the drum 3 and adapted when the desired quantity of liquid has been delivered to allow the actuation of a plunger 47 which admits air to the suction side of a pump supplying liquid to the containers in the manner described in the specification of our British Patent No. 272,985.

In operation, when the setting knob 2 is rotated the drum 7, indicating the quantity of liquid which is ordered, and the springs 6 and 14 are wound up by the engagement of the cranked member 12 with the abutment 12' reversal of the barrel 3 (and hence of the drum 7) and movement of the barrel 15 (and hence the drum 22) being prevented by the pawls 10, 19 and the ratchet wheels 11, 20 respectively.

When the drum 7 indicates the quantity of liquid which has been ordered, and the apparatus for delivering the liquid is operated, then, as the change-over mechanism is actuated, the lever 38 and hence the levers 29 and 33 are rocked so as step-by-step to release the escape wheel 21, the drums 7, 22, barrels 3 and 15 spindle 1 and sleeve 13, being rotated by the spring 6 in a direction opposite to that in which the knob 2 was rotated; the spring 14 during this operation, turns with the barrel 15 and sleeve 13 without being unwound. When the drum 7 has returned to its original position, the drum 22 indicates the quantity of liquid which has been delivered and the cam disk 46 allows the actuation of the plunger 47.

When the spindle 1 is again actuated to reset the mechanism, the first movement thereof causes the cam wheel 18 to lift the pawl 17 and hence the pawl 19 is moved out of engagement with the ratchet wheel 20, while the arm 24 is forced over and retained by the rim of the ring 25. The barrel 15 and hence the drum 22 are thereby released, and the spring 14 which had been wound up by the original rotation of the knob 2, causes the said drum and barrel to rotate to their zero position, in which position a projection 48 on the barrel 15 comes against a fixed stop 49, and simultaneously the arm 24 comes opposite the cut away portion 26 of the ring 25, thereby allowing the pawl 19 to fall into engagement with the ratchet wheel 20.

As the lever 29 is rocked, the lever 41 pivoted thereto moves idly along the slot 42 until, when a change-over spring completes the movement of the change-over mechanism in the manner described in my said application No. 244,342, filed January 3, 1928 for means for filling two containers alternately the lever engages one or other of the end walls of the slot 42; further movement of the lever 29 then causes the lever 41 to rock on its pivot and the counting mechanism 44 is actuated by the link 43.

Preferably the teeth 27, 28 and the projection 36 are also so arranged that the escape wheel is not released until the over-centre spring takes charge of the change-over mechanism.

If it be desired to move the setting indicator towards its original position after it has been set, as for example, when a customer has ordered a certain quantity of liquid and afterwards desires to have a smaller quantity, this may be effected by rotating the knob 2 in the reverse direction, whereby the crank member 12 is moved into engagement with the pawl 10 which is thereby raised out of engagement with the ratchet wheel 11, and the barrel 3, and hence the drum 7, moved towards their original or zero positions by the spring 6.

It will be seen that the indicator may readily be detached from the change-over mechanism.

What I claim is:—

1. In an indicating mechanism, the combination of a setting indicator which indicates the quantity to be delivered, energy storing means which are energized by actuation of the setting indicator, release means which are actuated during delivery, and a second indicator which indicates the quantity which has been delivered and which, upon actuation of said release means, is actuated by said energy storing means.

2. In an indicating mechanism, the combination of a setting indicator, which indicates the quantity to be delivered, spring means which are wound up by actuation of said setting indicator, release means which are actuated during delivery, and a second indicator which indicates the quantity which has been delivered and which, upon actuation of said release means, is actuated by said spring means.

3. In an indicating mechanism, the combination of a setting indicator, which indicates the quantity to be delivered, spring means which are wound up by actuation of said setting indicator, release means which are actuated during delivery, a second indicator which indicates the quantity which has been delivered and which, upon actuation of said release means, is actuated by said spring means, and a second spring means which is wound-up by said setting indicator and upon the resetting of said setting indicator automatically returns said second indicator to zero position.

4. In an indicating mechanism, the combination of a manually operated setting indicator adapted to indicate the quantity to be delivered, a second indicator adapted to indicate the quantity which has been delivered, release means adapted to be actuated as the quantity is delivered, and energy storing means adapted to be energized upon manual operation of the setting indicator and adapted, upon actuation of said release means, automatically to actuate said setting and second indicators.

5. In an indicating mechanism, the combination of a setting indicator adapted to indicate the quantity to be delivered, a second indicator adapted to indicate the quantity which has been delivered, release means adapted to be actuated as the quantity is delivered, energy storing means adapted to be energized upon manual operation of the setting indicator and adapted, upon actuation of said release means, automatically to actuate said setting and second indicator, and a second energy storing means adapted to be energized upon manual operation of said setting indicator and adapted automatically to return said second indicator to zero position upon the resetting of said setting indicator.

6. In an indicating mechanism, the combination of a setting indicator adapted to indicate the quantity to be delivered, a second indicator adapted to indicate the quantity which has been delivered, release means adapted to be actuated as the quantity is delivered, and spring means adapted to be wound up by the manual operation of said setting indicator and adapted, upon actuation of said release means, automatically to actuate said setting and second indicators.

7. In an indicating mechanism, the combination of a setting indicator adapted to indicate the quantity to be delivered, a second indicator adapted to indicate the quantity which has been delivered, release means adapted to be actuated as the quantity is delivered, spring means adapted to be wound up by the operation of said setting indicator and adapted, upon actuation of said release means, automatically to actuate said setting and second indicators, and a second spring means adapted to be wound up upon manual operation of said setting indicator and adapted, automatically to return said second indicator to zero position upon the resetting of said setting indicator.

8. In an indicating mechanism, the combination of a setting indicator adapted to indicate the quantity to be delivered, energy storing means adapted to be energized by actuation of said setting indicator, release means, a second indicator adapted to indicate the quantity which has been delivered and which is adapted, upon actuation of said release means, to be actuated by said energy storing means, and means which, upon the resetting of said setting indicator, automatically returns said second indicator to zero position.

9. In an indicating mechanism, the combination of a setting indicator comprising an indicator drum, energy storing means within said drum energized by manual actuation of said setting indicator, release escapement means for said drum, a delivery indicator comprising a drum operated by said energy storing means upon actuation of said escapement means.

10. In an indicating mechanism, the combination of a setting indicator comprising an indicator drum, energy storing means within said drum energized by manual actuation of said setting indicator, release escapement means for said drum, a delivery indicator comprising a drum operated by said energy storing means upon actuation of said escapement means, said drums having a common axis.

11. In an indicating mechanism in combination a shaft, a setting indicator drum and a delivery indicator drum mounted thereon, spring means placed under tension by rotation of said shaft to set said setting indicator drum, escapement means for releasing said spring to actuate said delivery indicator drum and spring means placed under tension by actuation of setting indicator drum to return said delivery drum to zero position when released.

12. In an indicating mechanism in combination a shaft, a setting indicator drum and a delivery indicator drum mounted thereon, spring means placed under tension by rotation of said shaft to set said setting indicator drum, escapement means for releasing said spring to actuate said delivery indicator drum and spring means placed under tension by actuation of setting indicator drum to return said delivery drum to zero position when released, said second spring means being released by a resetting operation of said setting drum.

In testimony that I claim the foregoing as my invention I have signed my name this 15th day of December, 1927.

JOSEPH LAWSON.